Nov. 24, 1959   P. H. McMURRAY   2,914,025
FOUNTAIN TANK
Filed Nov. 1, 1956   2 Sheets-Sheet 1

INVENTOR.
P. H. McMURRAY
BY Robb & Robb
attorneys

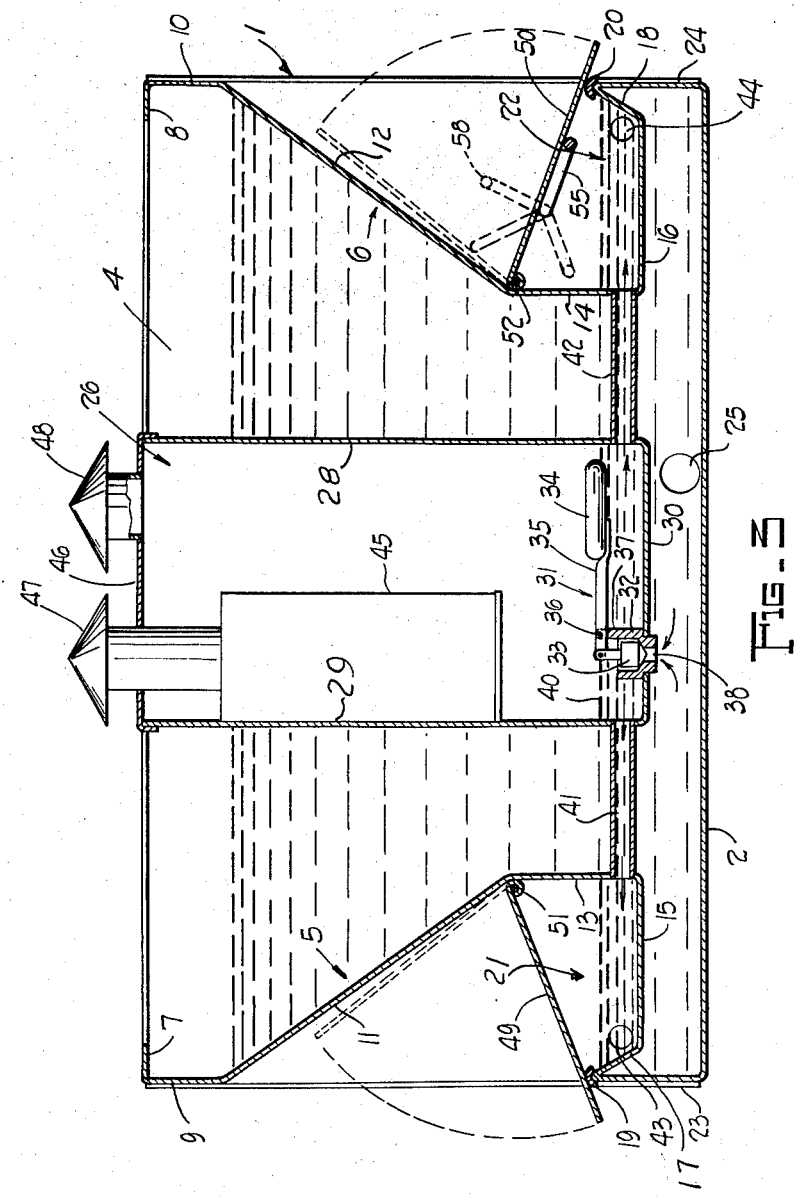

United States Patent Office 2,914,025
Patented Nov. 24, 1959

2,914,025

FOUNTAIN TANK

Paul H. McMurray, Delphi, Ind., assignor to Delphi Products Company, Incorporated, Delphi, Ind., a corporation Application November 1, 1956, Serial No. 619,780

1 Claim. (Cl. 119—73)

This invention relates to stock watering tanks and primarily to such tanks having means for storing water and supplying the necessary quantity of the same to troughs from which livestock may drink.

Whereas heretofore troughs have been constructed for watering purposes and the supply maintained from a constant pressure source, serious problems have arisen in such service, including mechanical difficulties with valves because of the pressures applied thereto, and freezing of the lines and water in troughs during cold seasons.

In addition to the foregoing objections, prior supply systems were susceptible of being overturned or severely damaged by the livestock for one reason or another.

Additionally, to the above, the abrasive action occurring when hogs used prior devices, results in the rapid wear of parts of the same so as to render them useless, since repair is also nearly impossible.

Having in mind the foregoing, the primary object of this invention has been to overcome the objections above outlined, and to still further improve on known devices by combining the best qualities with new features.

A principal object of the invention, therefore, is to provide a stock watering tank which is capable of storing a large quantity of water, and supplying the water to troughs which are readily accessible to all types of livestock, yet protected from heat and litter.

A further object of the invention is to provide a tank of the class described, wherein a drinking trough or troughs may be arranged so as to be virtually surrounded by a substantial quantity of water which acts as insulation for the water in the trough, whereby it will be maintained at nearly constant temperature, neither too hot nor likely to freeze under temperature extremes.

Yet another object of the invention is to provide a tank as described, having a supply section therein, which is connected to the main tank, the supply section in turn being connected to the troughs, the water level thereby being maintained at a suitable height in the troughs as controlled by means in the supply tank aforesaid.

A still further object hereof is to provide a trough or troughs which have a hardened lip or lips to minimize wear by abrasion as a result of constant use by hogs or the like.

Another object of the invention is to arrange a control valve unit within the supply section of the storage tank, whereby liquid surrounding such section acts as insulation therefor.

A still further object of the invention is to provide a trough to which water is supplied, which trough is arranged to be accessible to livestock, though lying generally within the confines of the storage tank, said trough having a series of covers normally manipulable by livestock, novel means being provided to raise at least certain of said covers, and maintain them in raised position to enable young animals to drink.

Other and further objects of the invention will be understood from a consideration of the specification appended hereto, and shown in the drawing wherein:

Figure 3 is a transverse sectional view on an enlarged scale taken about on the line 3—3, looking in the direction of the arrows in Figure 1.

Figure 1:
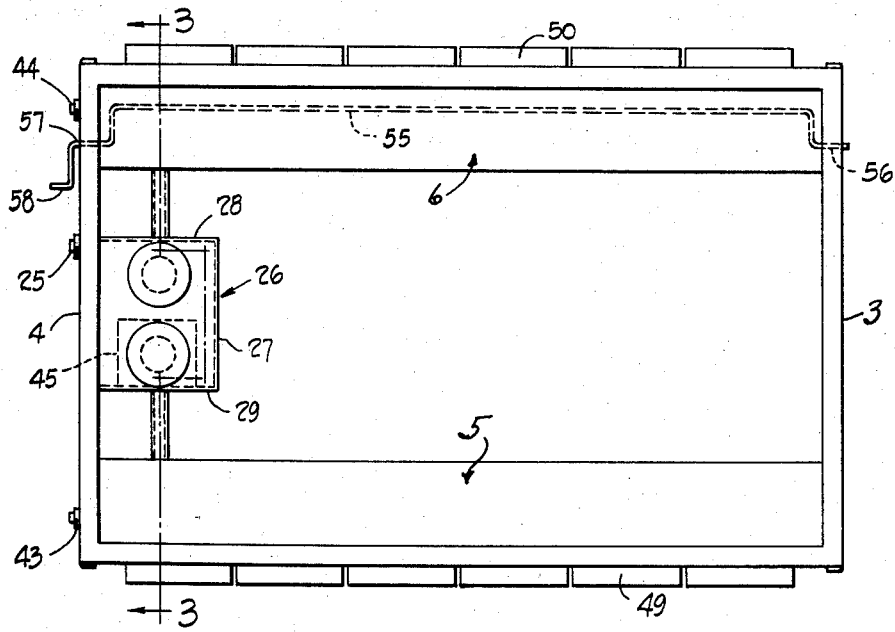
Figure 1 is a top plan view of a tank constructed in accordance with this invention, showing certain of the details thereof.
Figure 2:
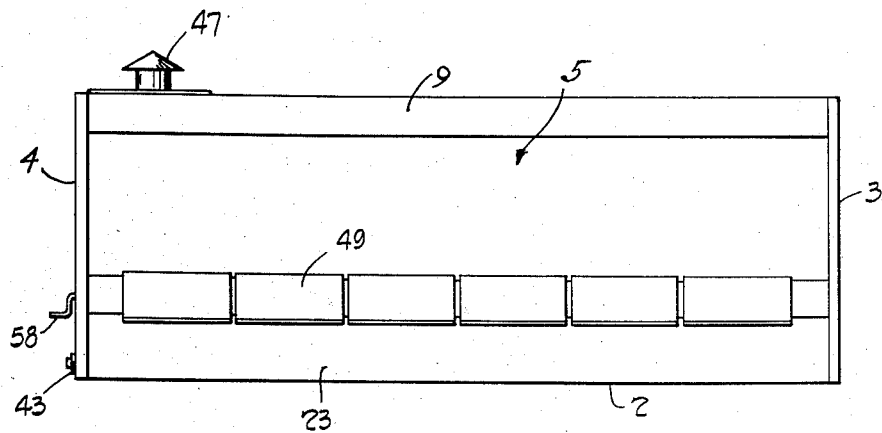
Figure 2 is a side elevation of the tank shown in Figure 1.

Referring to the drawing, Figure 1 discloses the tank hereof as comprising a generally rectilinear unit, indicated at 1, the same being of substantial length and width, and Figure 2 indicates that the same is proportionally of corresponding height, the entire unit being constructed of very heavy gauge metal, and welded or otherwise suitably fastened at the joints provided in accordance with known practice.

The tank as a whole is provided with a bottom 2, and upstanding vertical end plates 3 and 4. Between the end plates 3 and 4 extend the side portions generally denoted 5 and 6, reference being here made to Figure 3, said sides 5 and 6 being substantially identical, and including inwardly turned lips 7 and 8, a vertical portion for each indicated at 9 and 10, and inwardly extending sections 11 and 12, which converge toward the central portion of the tank.

At the lower edges of the portions 11 and 12, and formed integrally therewith or otherwise connected thereto, are the further parts 13 and 14, which extend substantially vertically from the portions 11 and 12 respectively, and terminate at their lower ends in the trough bottom sections 15 and 16 respectively.

The trough bottoms 15 and 16 extend substantially horizontally and at their outer edges are bent upwardly as at 17 and 18, terminating beneath the lip portions 19 and 20 of special form.

From the foregoing, it will be readily apparent that troughs are formed by the parts 13, 15, and 17 for example, or 14, 16, and 18, such troughs being designated as 21 and 22 and extending lengthwise of the tank from end plate 3 to end plate 4 in each instance.

Further considering Figure 3, it will be noted that below the lip portions 19 and 20 of each of the troughs 21 and 22, are provided downwardly extending side sections 23 and 24, which are fastened at their lower portions in any suitable manner to the bottom 2 of the tank itself.

As viewed in Figure 3, the tank just above described may be generally said to comprise an inverted T-shaped unit in section, the head of the T constituting a lower liquid reservoir section of about the same area as the upper portion of the tank, which may be termed an upper liquid reservoir section for the purposes hereof. The troughs 21 and 22 lie within the outline of the tank, which in this instance may be called a storage tank, so that the said troughs are in large measure protected from exposure and surrounded by any liquids which will be in the tank and rising above the rear walls 13 and 14 of the troughs.

Troughs 21 and 22 are provided with lip covering material comprising the portions 19 and 20, which is of hard nature, and may be applied by known welding technique so that during use by animals the abrasion of the necks of hogs over the lips will not noticeably affect the said lips and thus wear thereof is avoided.

As seen in Figure 3, a suitable drain outlet is provided for the main storage tank at 25, this being equipped with any suitable cap or other device which may be removed so as to permit drainage of such tank. It will be apparent also that the amount of liquid which is capable of being stored in the tank is of large volume, and it remains only to be able to supply the liquid within the tank to the individual troughs, as will now be explained.

Referring to Figure 3 again, and also noting Figure 1, at one end of the tank may be provided a supply section, which is denoted generally at 26, including the transverse side 27, and other sides 28 and 29, connected thereto. The sides 28 and 29 are in turn suitably fastened to the end plate 4, so as to be watertight with regard thereto, and a bottom 30 is provided, the supply tank setcion 26 being thereby separated from the main body of the storage tank 1.

It is found desirable to admit a certain quantity of water into the supply tank 26, and this is done by means of a valve control unit generally indicated at 31 in Figure 3 primarily.

The valve control unit 31 is preferably of the float type, and is arranged as generally indicated in Figure 3 so as to be provided with a body 32 within which is adapted to operate a plug 33. Plug 33 slides upwardly and downwardly under the control of the float 34 mounted on the end of an arm 35. The arm 35 is pivotally connected at 36 to an upstanding portion 37 of the body 32. Liquid from the tank 1 enters through the lower part 38 of the body 32, and flows upwardly as permitted by the position of the float 34 and its location of the plug member 33 thereby. Obviously, when the float moves downwardly from the position shown in Figure 3, the plug member is raised, and the flow of liquid is permitted through the opening 38.

The supply section 26, is adapted to contain a certain amount of water or other liquid as the case may be, as indicated, and to about the level at 40. The supply section is in turn connected with each of the troughs 21 and 22 by means of the conduits 41 and 42, through which the water in this supply section may flow to the troughs and seek a level established by level 40 in the supply section 26.

Each of the troughs 21 and 22 may be equipped with a suitable opening at 43 and 44, plugged or otherwise equipped with a removable member, whereby the trough may be drained and cleaned out.

One of the purposes of the supply section 26 arranged as it is within the tank 1, is to provide the same with an insulating medium in the liquid within the tank, the liquid in the tank substantially surrounding the section, thereby maintaining the temperature therewith. Additionally, the section 26 may be equipped with a suitable heater generally indicated at 45, the details of the heater not being shown, but being readily provided by those skilled in the art. Of course, the section may be in turn supplied with a suitable removable cover indicated at 46, vents 47 and 48 being provided for obvious purposes.

Reverting now to a discussion of the troughs 21 and 22, it will be seen that each of the same is provided with a plurality of cover members, which are designated 49 and 50 respectively, the cover members being hingedly connected at 51 and 52 in any suitable manner, whereby the covers may be moved into the dotted line positions shown in Figure 3, the outer ends of the covers being raised by the animals to obtain access to the troughs 21 and 22.

Under some conditions where it is necessary to teach young pigs, for example, to drink, it is desirable to maintain the cover members 50 for example, in raised condition in the dotted lines position, and for this purpose, a suitable latch device is arranged, the device consisting of a pivotally mounted rod unit of generally U-shaped configuration indicated at 55 in the dotted lines in Figure 1, the pivotal mounting being afforded by the angularly positioned part 56 at one end of the rod 55, a similar formation of the rod being provided at 57 at the other end. This formation terminates in a crank portion 58, manipulable from the exterior of the tank, adjacent the end plate 4 previously mentioned. The arrangement of this device is such as to permit the same to move all of the covers for example, at one time by pressing downwardly upon the crank 58 to thus swing the portion 55 of the rod upwardly, and thereby the cover members 50 into the dotted line position shown in Figure 3. The cover members will thus be maintained in open position and the trough accessible for young pigs to drink.

From the foregoing, it will be readily appreciated that the troughs 21 and 22 are arranged within the confines substantially of the tank as a whole, and thereby substantially surrounded by liquid in the tank to thus maintain the water within the troughs in clean condition and prevent the same from becoming too hot or from freezing in temperature extremes. Obviously, if water is in the main tank, and is maintained heated somewhat by heater 45 for example, the water in the troughs will not freeze. Further, by positioning the heater 45 as indicated in the supply section 26, the valve unit 31 is maintained in condition to operate at all times, since the water is not frozen within that section, and the float will continue to operate to admit water into the supply section, and thereby through the conduits 41 and 42 to the troughs 21 and 22, respectively.

Further, in view of the provision of hardened lips 19 and 20, abrasion as a result of drinking is reduced to a minimum, and wear is likewise in a large measure obviated at the lips, lengthening the life of the tank obviously, as will be readily appreciated.

I claim:

In a stock drinking supply device of the class described, in combination, a generally rectilinear unit having an upper liquid storage reservoir section and a supply portion separate therefrom at one end and within the confines thereof, a heating unit in the supply portion, said section having generally inwardly converging sides, a lower reservoir section substantially co-extensive with the maximum area of the upper section, a trough unit extending along at each side of the device from end to end above the lower reservoir and within the confines of the maximum area aforesaid, connections from the upper to the lower reservoir section from the lower reservoir section to the supply portion and from the latter to the troughs, means in the supply portion and connected to the troughs for controlling liquid flow from the lower reservoir section to the troughs so as to maintain a constant supply to the latter, said trough units being substantially completely surrounded by liquid in the reservoirs mentioned, said units being further provided with lips to which material is separately applied to thereby cause said lips to be abrasion resistant.

References Cited in the file of this patent

UNITED STATES PATENTS

| | | |
|---|---|---|
| 1,725,628 | Gerhardt | Aug. 20, 1929 |
| 1,786,049 | Zoeller | Dec. 23, 1930 |
| 1,806,473 | Langer | May 19, 1931 |
| 2,345,400 | Laughead et al. | Mar. 28, 1944 |
| 2,532,999 | Donahoe et al. | Dec. 5, 1950 |